(12) United States Patent
Iimura

(10) Patent No.: US 8,915,587 B2
(45) Date of Patent: Dec. 23, 2014

(54) EYEGLASS FRAME

(75) Inventor: Yuichi Iimura, Setagaya-ku (JP)

(73) Assignee: Four Nines Co., Ltd., Tokyo (JP)

( * ) Notice: Subject to any disclaimer, the term of this patent is extended or adjusted under 35 U.S.C. 154(b) by 0 days.

(21) Appl. No.: 13/012,997

(22) Filed: Jan. 25, 2011

(65) Prior Publication Data
US 2011/0181830 A1 Jul. 28, 2011

(30) Foreign Application Priority Data

Jan. 25, 2010 (JP) ................................ 2010-012994

(51) Int. Cl.
G02C 5/14 (2006.01)
G02C 5/22 (2006.01)
G02C 5/16 (2006.01)

(52) U.S. Cl.
CPC *G02C 5/16* (2013.01); *G02C 5/146* (2013.01); G02C 2200/22 (2013.01)
USPC ............................. 351/114; 351/119; 351/153

(58) Field of Classification Search
CPC ...... G02C 5/16; G02C 5/2218; G02C 5/2254; G02C 5/146; G02C 2200/22
USPC ........... 351/119, 121, 153, 111, 114, 41, 113; 16/228
See application file for complete search history.

(56) References Cited

U.S. PATENT DOCUMENTS

| | | | |
|---|---|---|---|
| 2,962,562 A * | 11/1960 | McCarrell | 381/327 |
| 5,673,095 A | 9/1997 | Conway | |
| 5,708,491 A * | 1/1998 | Onodera et al. | 351/122 |
| 5,959,715 A | 9/1999 | Jaffelin | |
| 5,987,702 A * | 11/1999 | Simioni | 16/228 |
| 6,000,797 A | 12/1999 | Ichihashi et al. | |
| 6,336,250 B1 * | 1/2002 | Takeda et al. | 16/228 |
| 6,438,798 B1 * | 8/2002 | Chene et al. | 16/335 |
| 2005/0243271 A1 * | 11/2005 | Oura et al. | 351/153 |
| 2009/0316108 A1 * | 12/2009 | Lee | 351/153 |

FOREIGN PATENT DOCUMENTS

| | | | |
|---|---|---|---|
| DE | 20 2004 007 003 | 7/2004 | |
| DE | 20 2004 007 003 | 8/2004 | |
| DE | 10 2005 034 885 | 2/2007 | |
| EP | 2 107 415 | 10/2009 | |
| EP | 2107415 A1 * | 10/2009 | G02C 5/22 |
| FR | 2 805 053 | 8/2001 | |
| GB | 317 689 | 8/1929 | |
| JP | 2001-500277 | 1/2001 | |
| JP | 2001-147405 | 5/2001 | |

(Continued)

OTHER PUBLICATIONS

Machine translation of JP 2001-100158 obtained Apr. 25, 2014 from JPO AIPN.*

(Continued)

*Primary Examiner* — Alicia M Harrington
*Assistant Examiner* — Cara Rakowski
(74) *Attorney, Agent, or Firm* — Wenderoth, Lind & Ponack, L.L.P.

(57) ABSTRACT

An eyeglass frame includes a front portion, a hinge provided on each of both ends of the front portion, and a temple connected to the front portion via the hinge. The hinge has a hinge piece, the temple has a metal connection part integrally formed with the hinge piece, and the connection part has a partially reduced section to form an elastic portion.

8 Claims, 8 Drawing Sheets

(56) References Cited

FOREIGN PATENT DOCUMENTS

| | | | |
|---|---|---|---|
| JP | 2001-290108 | 10/2001 | |
| JP | 2002-082319 | * 2/2002 | .............. G02C 5/16 |
| JP | 2002-82319 | 3/2002 | |
| JP | 2003-315744 | 11/2003 | |
| JP | 2004-46029 | 2/2004 | |
| JP | 2005-165193 | 6/2005 | |
| JP | 2005-250064 | 9/2005 | |
| JP | 2007-193040 | 8/2007 | |
| JP | 2008-257103 | 10/2008 | |
| JP | 2001-100158 | * 4/2014 | |

OTHER PUBLICATIONS

European Search Report issued Apr. 26, 2011 in European Patent Application No. 11 15 1811.

Korean Office Action mailed Jul. 9, 2012 in corresponding Korean Patent Application No. 10-2011-0006729.

Chinese Office Action issued Apr. 5, 2012 in corresponding Chinese Patent Application No. 201110025116.7.

* cited by examiner

EYEGLASS FRAME

CROSS REFERENCE TO RELATED APPLICATIONS

The present application is based on and claims priority from Japanese Application Number, 2010-012994 filed on Jan. 25, 2010, the disclosure of which is hereby incorporated by reference herein in its entirety.

BACKGROUND OF THE INVENTION

1. Field of the Invention

The present invention relates to an eyeglass frame, especially to an eyeglass frame including a temple in which an elastic portion is provided so that a soft usability can be obtained and a new design can be provided.

2. Description of the Related Art

A general eyeglass frame has a front portion in which lenses are fitted, a hinge portion provided on each of both ends of the front portion, and a temple connected to each of the both ends of the front portion via the hinge. A temple having a metal body portion comprising a hinge piece of the hinge and a resin end tip is often used. Further, in order to improve a comfortable fit when a user wears eyeglasses, a hinge including an elastic body such as a spring or the like has been used.

That is, the connection structure is a so-called spring hinge and the configuration in which an elasticity of the elastic body functions to allow the eyeglass frame to fit sides of a user's head when the temples are opened is known. For example, Japanese Patent Application Publication No. 2001-290108 discloses a connection structure using a coil spring as shown in FIG. 8.

The connection structure 180 is configured to connect a front portion 120 and a temple 130. In a connection part of the temple 130, a moving frame 190 in which a coil spring 191 is provided is provided. When the temple 130 is further opened than a state where the temple 130 is opened, that is, when the temple 130 is further opened from an opened position where the temple is opened, an end 129 of the front portion 120 contacts an end 199 of the moving frame 190 so that the coil spring 191 is compressed and therefore a restoring force is generated to bias the temple 130 in a direction to be turned back to an opened position of the temple 130.

However, the connection structure 180 requires a large connection part of the temple 130, as well as members such as the coil spring 191, the moving frame 190 in which the coil spring is housed, and the like. Accordingly, time and efforts are required in their manufacturing and repairs due to the complex structure.

Then, Japanese Patent Application Publication No. 2005-165193 discloses a connection structure using a plate spring instead of the coil spring, as shown in FIGS. 9A and 9B. Here, FIG. 9A shows a state where a temple 230 is opened at the opened position and FIG. 9B shows a state where the temple 230 is further opened from the opened position.

In the connection structure 280, one end of the plate spring 291 is screwed at an end of the front portion 220 and one hinge piece 251 of the hinge 250 is fixed at the other end of the plate spring 291. Then, in the state of FIG. 9A where the temple 230 is opened at the opened position, the plate spring 291 is not affected by any forces and in the state of FIG. 9B where the temple 230 is further opened from the opened position, the plate spring 291 is affected by a force and deformed so that a restoring force to turn the temple back to the opened position, that is, to be in the state of FIG. 9A is generated.

However, in the connection structure 280, the plate spring 291 is fixed only at one point on the end of the front portion 220, so that the plate spring 291 easily gets rickety to the front portion 220. Accordingly, there is a problem in that the temple 230 easily gets rickety to the front portion 220.

SUMMARY OF THE INVENTION

An object of the present invention is to provide a structure in an eyeglass frame including a front portion in which lenses are to be fitted, a hinge provided on each of both ends of the front portion, and a temple connected to the front portion via the hinge. The temple includes an elastic body, an elastic force of the elastic body allowing the temple to fit sides of a user's head when the temples are opened. The object of the present invention is also to provide an eyeglass frame in which a simple structure and reduced cost of manufacturing are achieved, and which prevents the temple from getting rickety to the front portion compared to the conventional eyeglass frame.

To achieve the above object, an eyeglass frame according to an embodiment of the present invention includes a front portion, a hinge provided on each of both ends of the front portion, and a temple connected to the front portion via the hinge. The hinge has a hinge piece, the temple has a metal connection part integrally formed with the hinge piece, and the connection part has a partially reduced section to form an elastic portion.

DETAILED DESCRIPTION OF THE PREFERRED EMBODIMENTS

Figure 1:
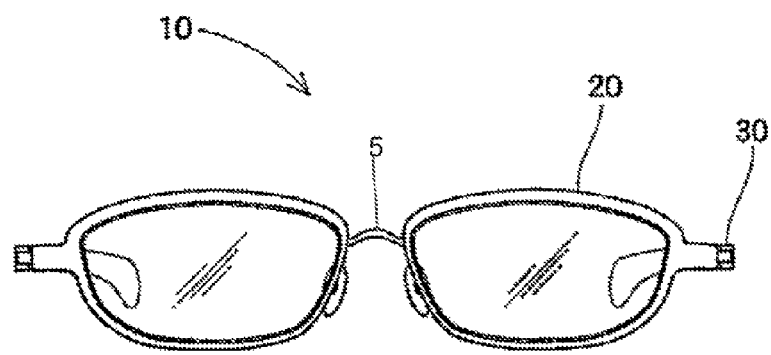
FIG. 1 is a schematic front view showing an example of an eyeglass frame according to the present invention.
Figure 2:
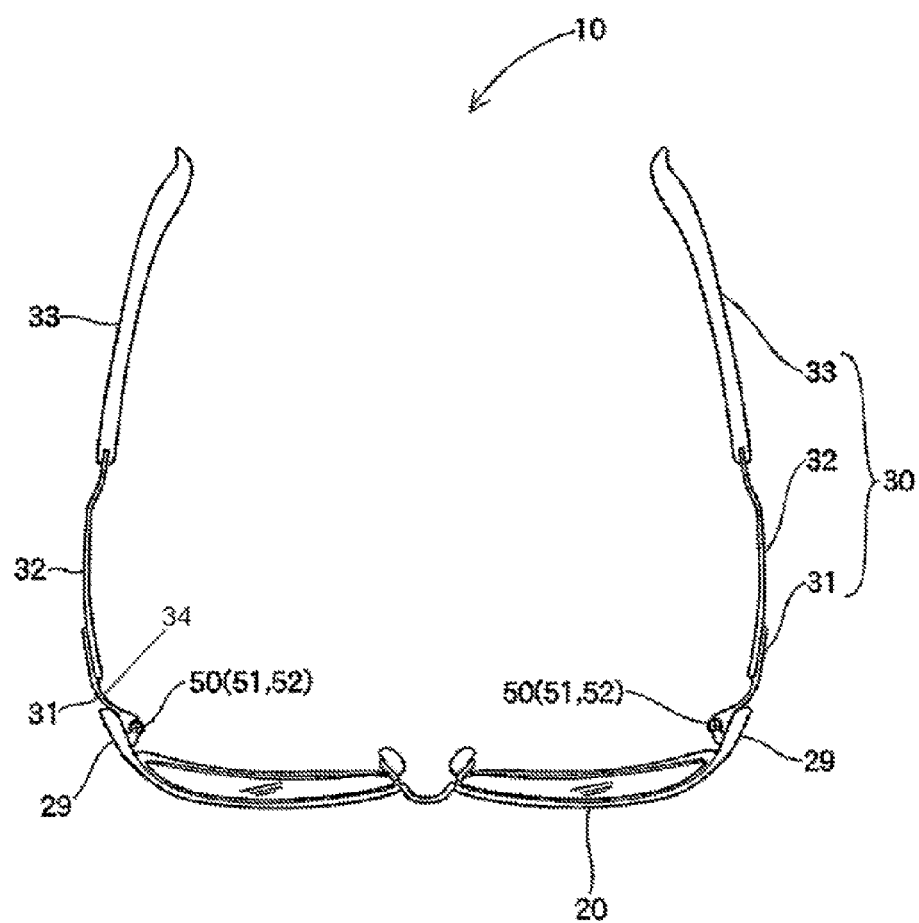
FIG. 2 is a schematic plan view showing the eyeglass frame of FIG. 1.
Figure 3A:
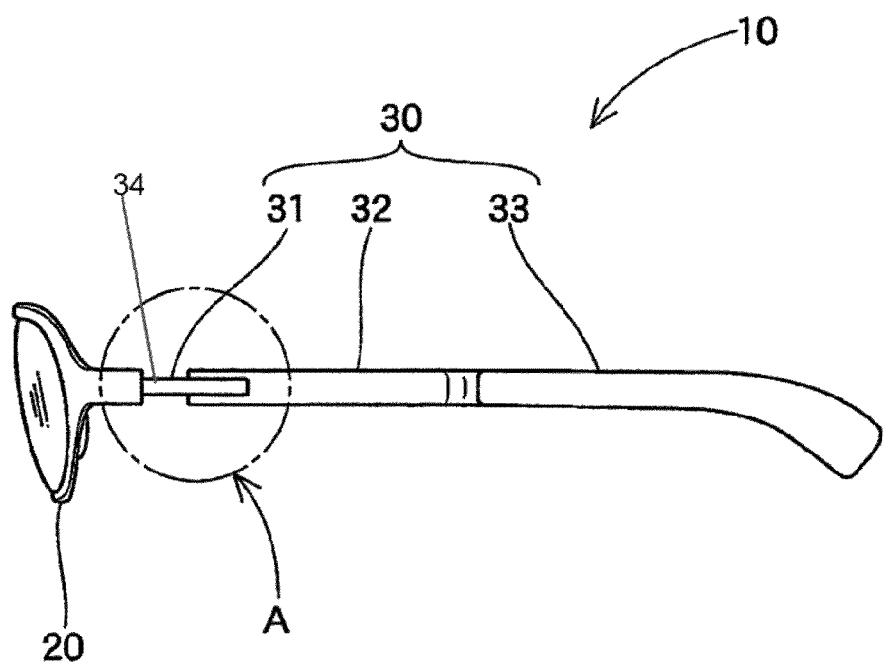
FIG. 3A is a schematic side view showing the eyeglass frame of FIG. 1.
Figure 3B:
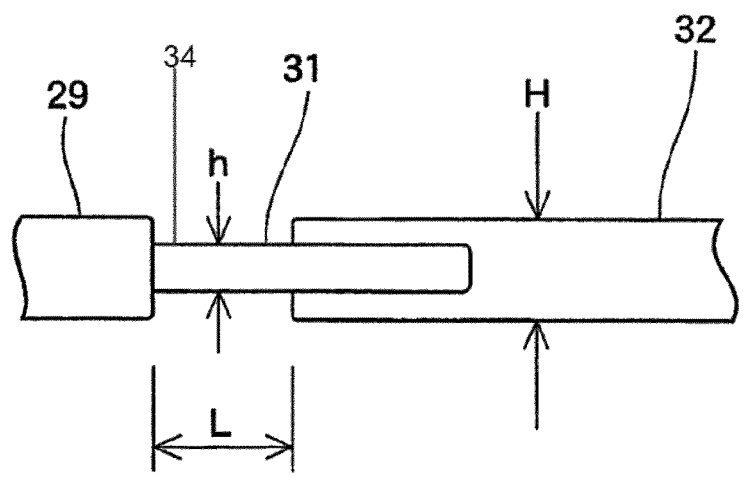
FIG. 3B is an enlarged view showing a part of the eyeglass frame shown by A in FIG. 3A

FIGS. 1 to 3B show an example of an eyeglass frame 10 of an embodiment of the present invention. FIG. 1 is a schematic front view, FIG. 2 is a schematic plan view, and FIGS. 3A and 3B are schematic side view.

The eyeglass frame of an embodiment of the present invention includes a front portion 20 having a bridge 5, a hinge 50 provided on each of both end portions 29 of the front portion 20, and a temple 30 connected to the front portion 20 via the hinge 50. As shown in FIG. 2, the end portions 29 extend in a rearward direction at opposite ends of the front portion 20. The hinge 50 has a hinge piece and the temple 30 has a metal connection part 31 integrally formed with the hinge piece. The connection part 31 has a partially reduced section 34 which forms an elastic portion.

The eyeglass frame has a general type in total and the temples 30 are connected via the hinges 50 to both ends 29 of the front portion 20 in which lenses are to be fitted.

The hinge 50 is a connection structure including a first hinge piece 51 at a side of the front portion and a hinge second piece 52 at a side of the temple 30. The temple 30 has a metal connection part 31 integrally formed with the second hinge piece 52 of the hinge, a metal body (temple body) 32, and a resin end tip 33. At least one portion of the connection part 31 has a reduced section 34 to form an elastic portion which is easily bent.

The elastic portion is in a range indicated by a length L in the connection part 31 in the enlarged view of FIG. 3B. The range does not necessarily have a clear boundary but has a most easily bent part. In the enlarged view, a height h of the elastic portion of the connection part is smaller than a height H of the other part of the connection part, for example, the metal body (temple body) 32, so that the section of the elastic portion is smaller than the other part. However, a width of the elastic portion in a horizontal direction may be reduced relative to the other part so that the section of the elastic portion is smaller than the other part. A material of the connection portion may be a metal used as a material of a general eyeglass frame, and may be a different metal from the metal of the front portion 20 or the temple body 32.

Figure 4:
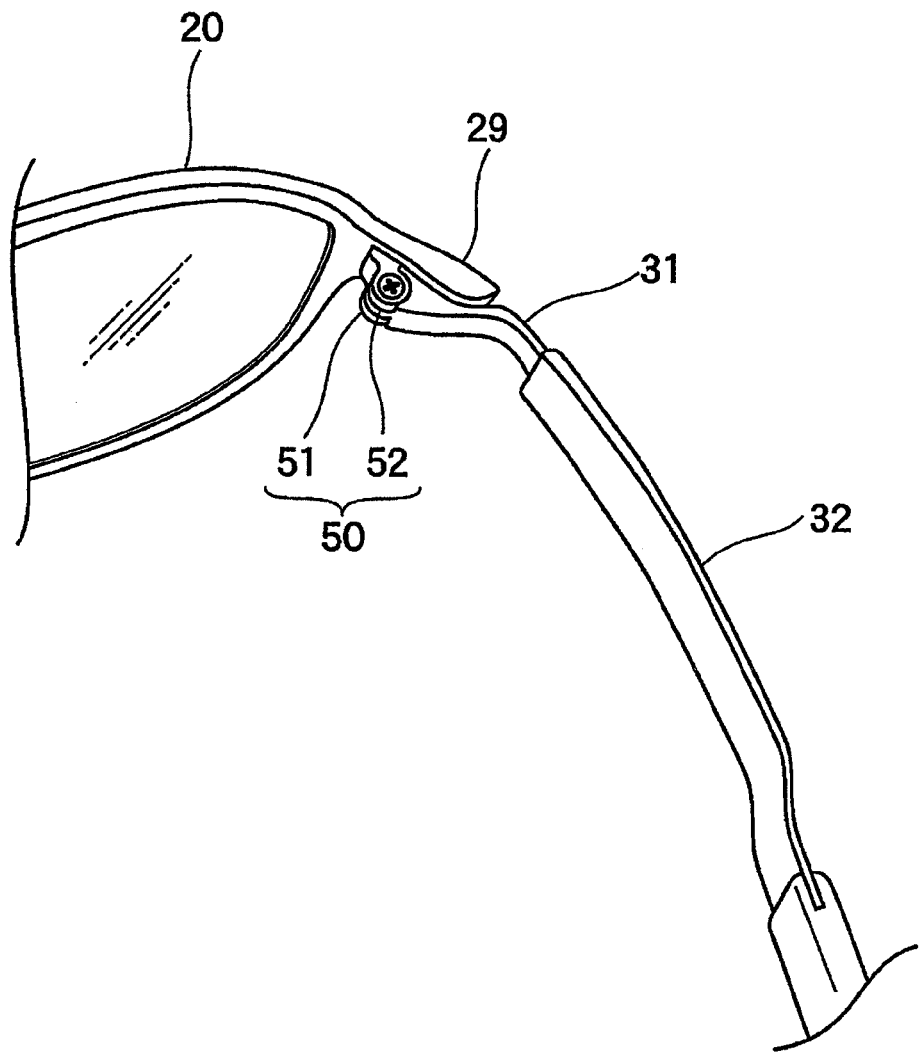
FIG. 4 is a schematic perspective view showing the eyeglass frame of FIG. 1 by enlarging a main part of the eyeglass frame.
Figure 5:
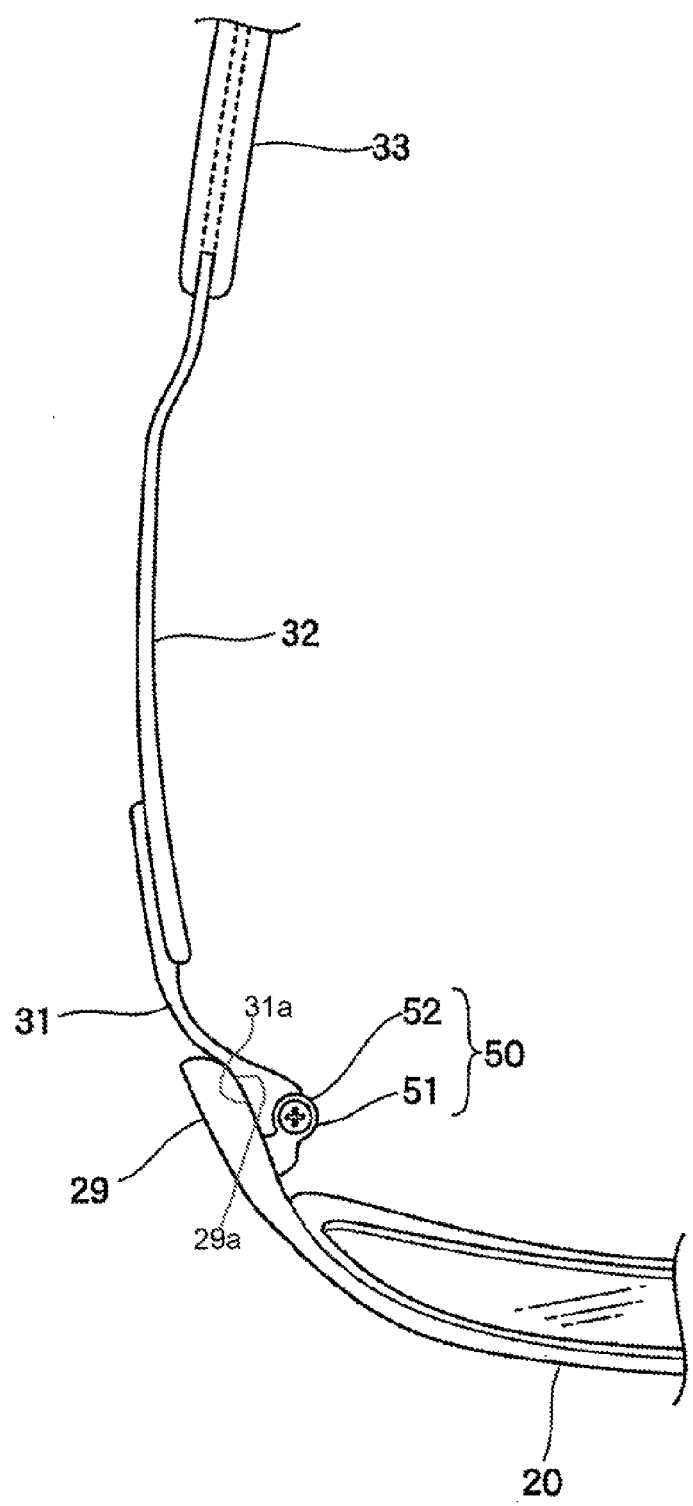
FIG. 5 is a schematic perspective view showing the eyeglass frame of FIG. 1 by enlarging a main part of the eyeglass frame in which the temple is opened at a normal opened position.

FIG. 4 is an enlarged perspective view showing a main part of the present invention, and FIG. 5 is an enlarged plan view showing the main part of the present invention. As shown in these views, it is preferable that the hinge 50 is provided at an inner surface side 29a of the end 29 of the front portion 20 and the connection part 31 has a curved outer surface 31a curvedly formed from the curved inner surface 29a of the end 29 of the front portion toward an outer surface side of the temple 30. Since the elastic portion is formed at a vicinity of the hinge 50, the hinge 50 is positioned at the inner surface side of the front portion 20, and the connection part 31 has a curved form, the eyeglass frame 10 of an embodiment of the present invention has the following advantageous effects.

Figure 6:
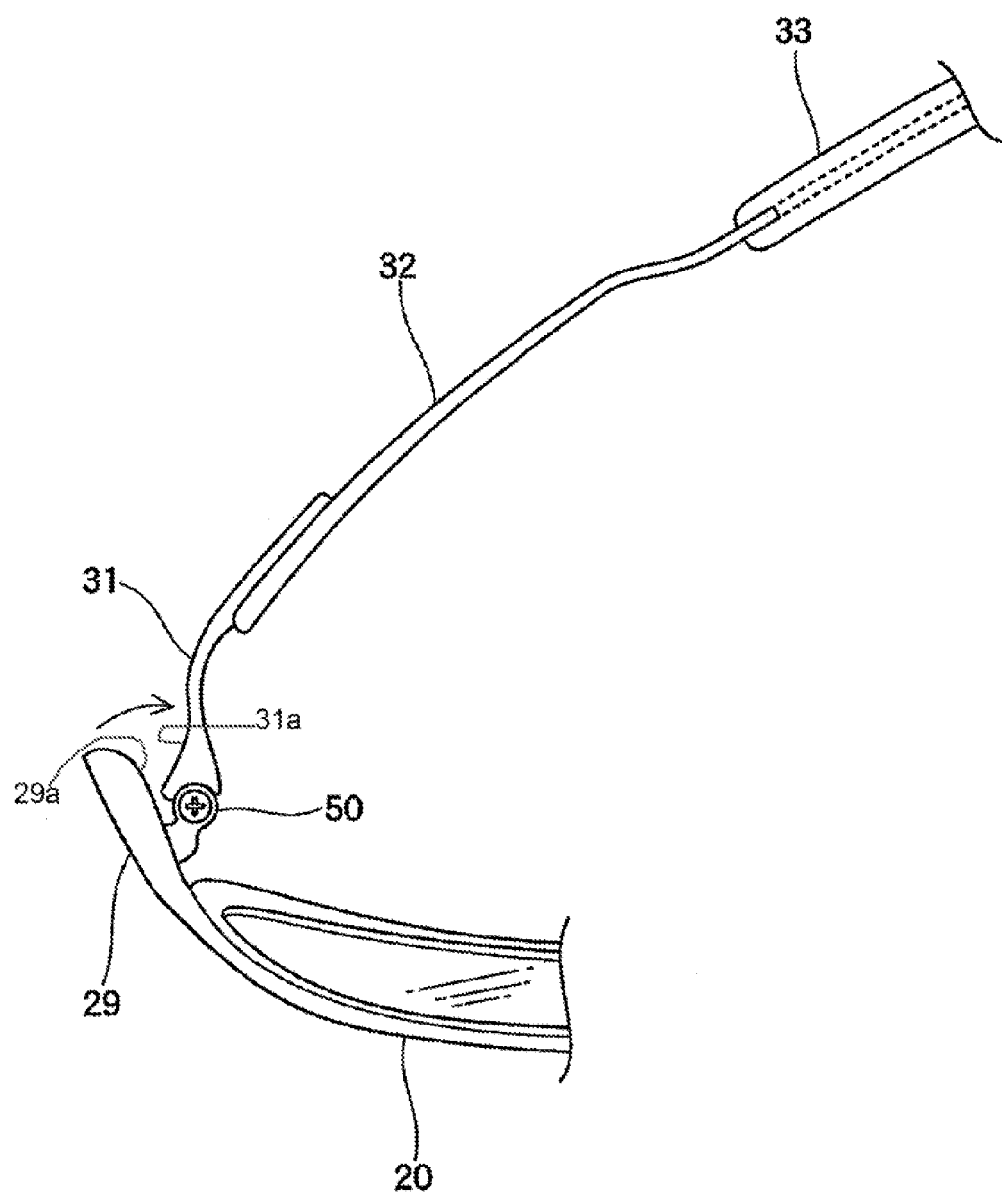
FIG. 6 is a schematic plan view showing the eyeglass frame of FIG. 1, in which the temple is in a slightly closed (a closed position) from the opened position of FIG. 5.

FIG. 5 shows a state where the temple 30 of the eyeglass frame 10 is opened at an opened position, and FIG. 6 shows a state where the temple 30 is slightly closed from the opened position of FIG. 5. In a region between states of FIGS. 5 and 6, the temple 30 is configured to be turned about the hinge 50 as a center. Then, although there may be a certain amount of a resistance or a friction generated according to a screwed state of the hinge 50, a restoring force is not generated in principle. In the state of FIG. 5, the temple 30 is opened and positioned by the curved outer surface 31a of the connection part 31 in contact with the curved inner surface 29a of the end 29 of the front portion 20 along an extent of the surfaces between the hinge 50 and a rear tip of the respective end portion 29, or by the hinge pieces 51 and 52 of the hinge 50 partially in contact with each other.

Figure 7:
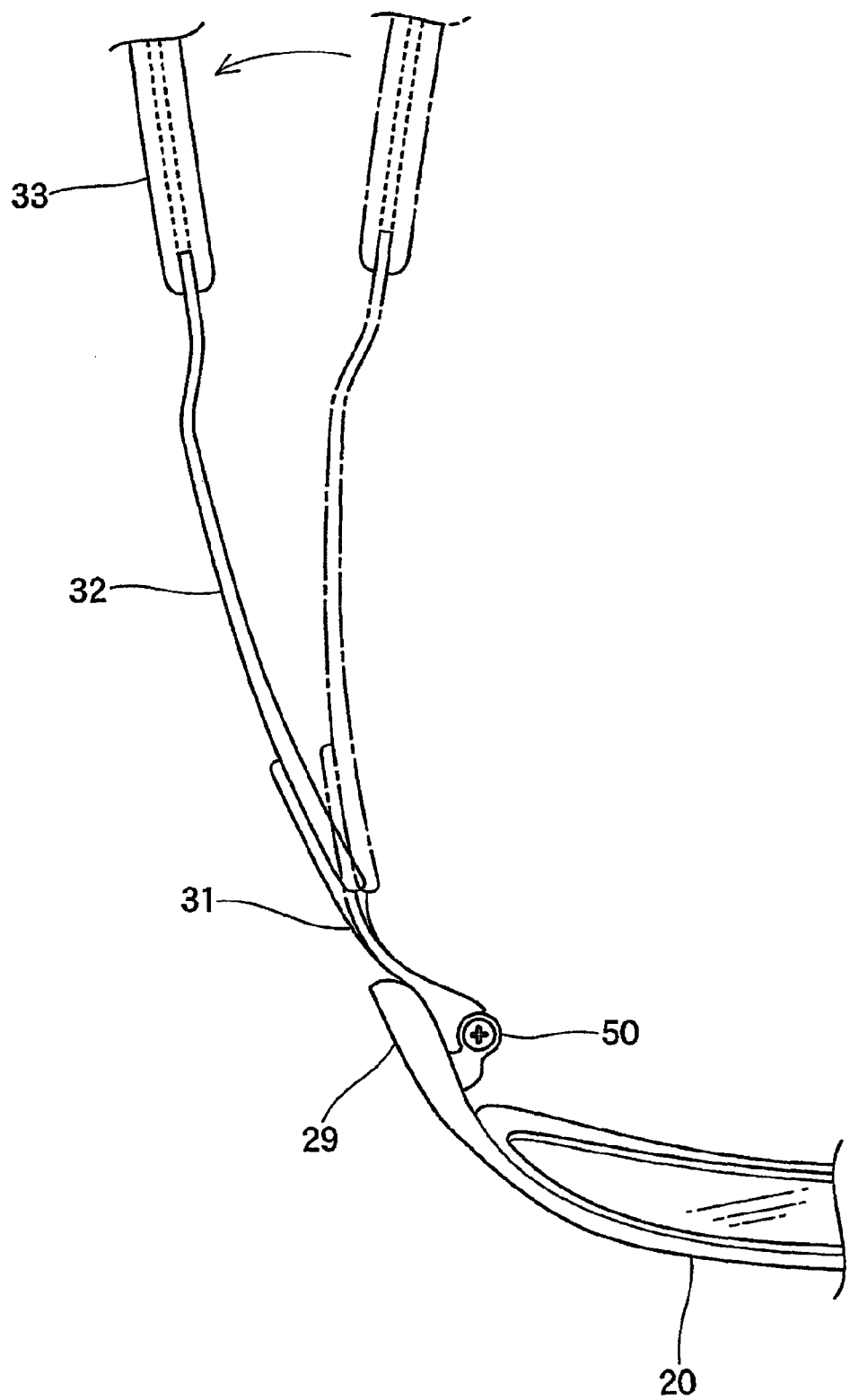
FIG. 7 is a schematic plan view showing the eyeglass frame of FIG. 1, in which the temple is further opened from the normal opened position to an overextended opened position of FIG. 5.
Figure 8:
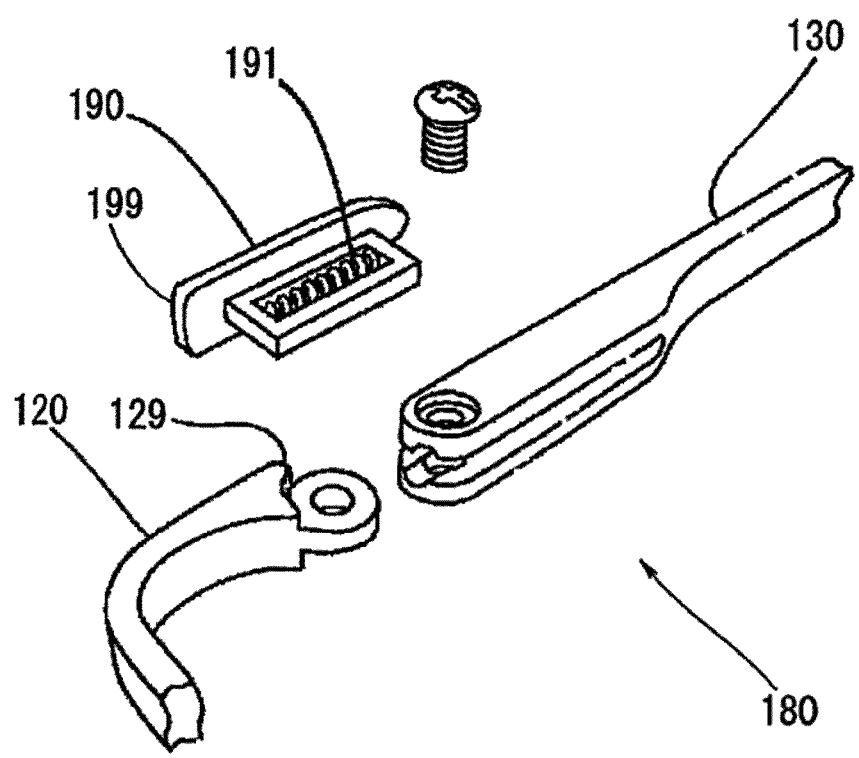
FIG. 8 is a schematic view showing an example of a conventional connection structure.
Figure 9A:
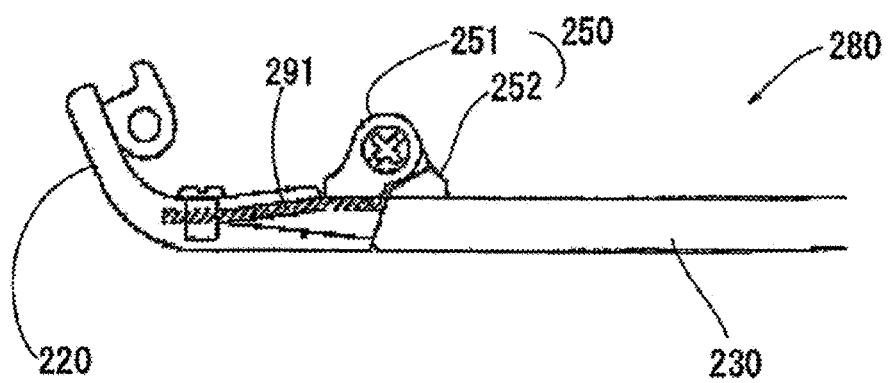
FIGS. 9A and 9B are schematic views showing another example of the conventional connection structure.
Figure 9B:
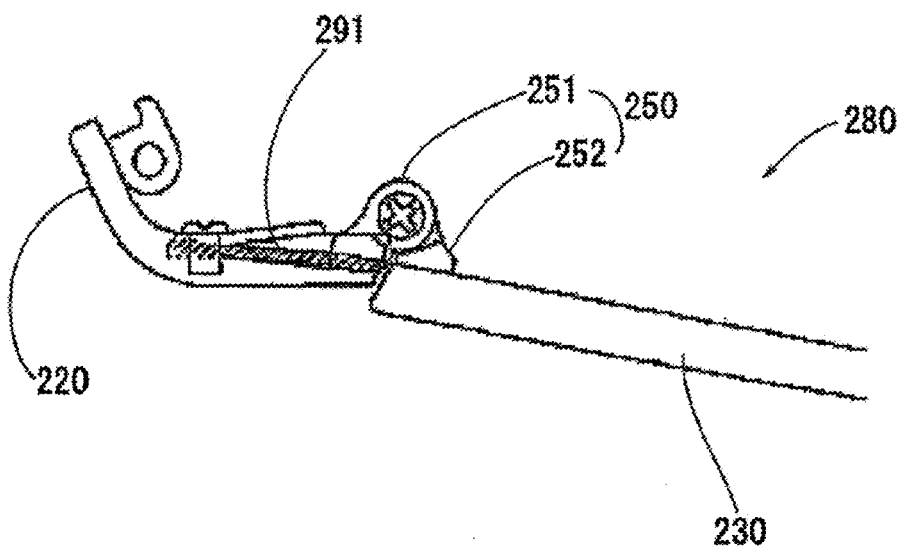

FIG. 7 shows a state where the temple 30 is further opened from the normal opened position of FIG. 5 to an overextended opened position. In a region between states of FIGS. 5 and 7, the temple 30 is not turned about the hinge 50 as the center but is opened by bending the elastic portion. Then, the restoring force proportional to a bent amount is generated so that the temple 30 tends to turn back to the opened position of FIG. 5. This is the same as a restoring force in the above-described connection structures 180, 280.

Then, since the elastic portion formed at the vicinity of the hinge 50 is bent by contacting the inner surface of respective end portion 29, a movement of the temple 30 relative to the front portion 20 appears as if the temple 30 is turned about the hinge 50 as the center. That is, the user has a feeling which is the same as the eyeglass frame using a spring hinge, so that a soft usability can be achieved.

The hinge 50 is positioned at the inner surface side of the front portion 20. Therefore, the eyeglass frame can be freely formed without a restricted appearance, and the hinge piece 52 of the connection part 31 can be formed in a shape and a dimension so as to have a sufficient strength. Furthermore, the connection between the connection part 31 and the temple body 32 may be simply performed by brazing and a connection structure having a sufficient strength can be used. Accordingly, the hinge 50 and the connection part 31 can be strongly formed so that the temple 30 is prevented from getting rickety to the front portion 20.

Furthermore, if the elastic portion is provided on the curved portion of the connection part 31, the length L of the elastic portion (see FIG. 3B) can be freely selected to a certain degree. That is, it is possible to increase the length L of the elastic portion so that a sufficient elasticity can be obtained even if the section area of the elastic portion is not reduced too much. The length L is preferably 8 mm or more and further preferably about 10 mm.

Since the restoring force of the elastic portion can be freely selected, by appropriately combining the elasticity of the elastic portion and a rigidity of the other part, the eyeglass frame 10 which fits the sides of the user's head can be formed. By adjusting the section area of the elastic portion, an amount of the restoring force to the opened angle can be adjusted. Since the connection part 31 can be curved and apparently has a short length, wide design variations can be achieved.

As described above, the eyeglass frame 10 according to an embodiment of the present invention has a structure in which the elastic force of the elastic portion is affected to allow the temple 30 to fit the sides of the user's head when the temples 30 are opened. The eyeglass frame according to an embodiment of the present invention also has a function which is the same as a conventional spring hinge and can have a very simple and strong structure with a low manufacturing cost. Furthermore, a simple appearance can be achieved so that new designs can be provided.

EFFECT OF THE INVENTION

The eyeglass frame according to an embodiment of the present invention has the elastic portion formed in the connection part of the temple and thereby it is possible to allow the elastic force to be affected and allow the temple to fit the sides of the user's head when the temple is opened. Since this elastic portion is formed by reducing the section area of the connection part, a simple structure and low manufacturing cost can be achieved compared to the conventional one. Furthermore, the elastic portion is formed in the connection part integrally formed with the hinge piece of the hinge and thereby the connection part is integrally formed with the temple body so that the temple can be prevented from getting rickety to the front portion.

Although the present invention has been described in terms of exemplary embodiments, it is not limited thereto. It should be appreciated that variations may be made in the embodiments described by persons skilled in the art without departing from the scope of the present invention as defined by the following claims.

What is claimed is:

1. An eyeglass frame comprising:
a front portion having end portions extending rearwardly from both ends of said front portion so that said end portions are integral with said front portion;
a pair of hinges located at said end portions of said front portion, each of said hinges having a hinge piece; and
a pair of temples rotatably connected to said end portions of said front portion via said hinges, each of said temples including:
a metal connection part integrally formed with said hinge piece of a respective one of said hinges; and
a body connected to said connection part;
wherein said connection part of each of said temples has an elastic portion having a smaller cross section than a cross section of said body of each of said temples;
wherein said connection part of each of said temples is curved from an inner surface side of said front portion toward an outer surface side of said body of a respective one of said temples to connect an inner surface of a respective one of said end portions of said front portion and a front end of an outer surface of said body;
wherein a front end of said connection part of each of said temples has a curved outer surface having a curved shape corresponding to a curved inner surface of a respective one of said end portions of said front portion, said curved outer surface of said connection part being in contact with said curved inner surface of said front portion along an extent of said curved inner surface from a respective one of said hinges to a rear tip of said respective one of said end portions when said temple is in a normal opened position or an overextended opened position;
wherein said connection part of each of said temples has a height smaller than a height of said respective one of said end portions of said front portion and smaller than a height of said body of said respective one of said temples; and
wherein said temples are configured to be opened further outward from the normal opened position to the overextended opened position by elasticity of said elastic portion such that said outer surface of said front end of said connection part of each of said temples contacts said inner surface of said respective one of said end portions of said front portion in the normal opened position and in the overextended opened position.

2. The eyeglass frame of claim 1, wherein said elastic portion has a length of 8 mm.

3. The eyeglass frame of claim 1, wherein each of said pair of temples comprises a resin end tip.

4. The eyeglass frame of claim 1, wherein said body of each of said pair of temples is a metal body, said elastic portion of said connection part of each of said temples having a smaller area than said metal body of a respective one of said temples.

5. The eyeglass frame of claim 1, wherein a rear end of said connection part of each of said temples is connected to said outer surface of said body of said respective one of said temples.

6. The eyeglass frame of claim 1, wherein said connection part and said body of each of said temples are discrete, non-integrated components, a rear end of said connection part of each of said temples has an inner surface attached to said outer surface of said body of said respective one of said temples.

7. The eyeglass frame of claim 1, wherein said connection part of each of said temples is curved from an inner surface side of said front portion toward an outer surface side of said body of a respective one of said temples in all positions of said temples, including a closed position, the normal opened position, and the overextended opened position.

8. The eyeglass frame of claim 1, wherein said front portion extends entirely between said end portions and includes a bridge in a center thereof.

* * * * *